(12) United States Patent
Graf

(10) Patent No.: US 10,013,406 B2
(45) Date of Patent: Jul. 3, 2018

(54) FLIP-TO-EDIT CONTAINER

(71) Applicant: SAP SE, Walldorf (DE)

(72) Inventor: Hans-Michael Graf, Stuttgart (DE)

(73) Assignee: SAP SE, Walldorf (DE)

( * ) Notice: Subject to any disclaimer, the term of this patent is extended or adjusted under 35 U.S.C. 154(b) by 406 days.

(21) Appl. No.: 14/715,231

(22) Filed: May 18, 2015

(65) Prior Publication Data

US 2016/0342579 A1 Nov. 24, 2016

(51) Int. Cl.
| | |
|---|---|
| G06F 3/048 | (2013.01) |
| G06F 17/24 | (2006.01) |
| G06T 11/00 | (2006.01) |
| G06F 3/0482 | (2013.01) |
| G06F 3/0484 | (2013.01) |
| G06T 11/60 | (2006.01) |

(52) U.S. Cl.
CPC ............ G06F 17/24 (2013.01); G06F 3/0482 (2013.01); G06F 3/04842 (2013.01); G06F 3/04845 (2013.01); G06T 11/001 (2013.01); G06T 11/60 (2013.01); *G06T 2200/24* (2013.01)

(58) Field of Classification Search
CPC .... G06F 17/24; G06F 3/0482; G06F 3/04842; G06F 3/04845; G06T 11/001; G06T 17/2247
See application file for complete search history.

(56) References Cited

U.S. PATENT DOCUMENTS

| | | | | |
|---|---|---|---|---|
| 5,351,995 A | * | 10/1994 | Booker | G06F 3/0483 283/117 |
| 6,601,057 B1 | * | 7/2003 | Underwood | G06F 17/21 707/770 |
| 2002/0140727 A1 | * | 10/2002 | Lindholm | G06F 3/0481 715/744 |
| 2008/0098319 A1 | * | 4/2008 | Lucas | G06F 3/0481 715/765 |
| 2008/0155576 A1 | * | 6/2008 | Horvitz | G06Q 30/0269 719/328 |

(Continued)

OTHER PUBLICATIONS

"Stackoverflow, Flip div with two sides of html", taken from https://stackoverflow.com/questions/9058801/flip-div-with-two-sides-of-html, published Feb. 7, 2013, 3 pages.*

(Continued)

*Primary Examiner* — William Bashore
*Assistant Examiner* — Gregory A Distefano
(74) *Attorney, Agent, or Firm* — Schwegman Lundberg & Woessner, P.A.

(57) ABSTRACT

A container is created that includes two sides. A front side of the container displays viewable content. A back side of the container displays editing controls corresponding to the viewable content. A button may be displayed that, when activated, switches the display between the front side and the back side. The button may be displayed only while the editing controls are displayed and hidden while the content is displayed. While the content is displayed, the entire display area may be responsive to a user input to cause display of the editing controls. Switching between the front-side element display and the back-side editing display may be accompanied by a flipping animation. Enabling the flip-to-edit container may be based on permissions of a user account.

17 Claims, 10 Drawing Sheets

(56) References Cited

U.S. PATENT DOCUMENTS

| | | | |
|---|---|---|---|
| 2008/0168382 A1* | 7/2008 | Louch | G06F 9/4443 |
| | | | 715/781 |
| 2010/0093400 A1* | 4/2010 | Ju | G06F 3/04817 |
| | | | 455/566 |
| 2011/0164042 A1* | 7/2011 | Chaudhri | G06F 3/0481 |
| | | | 345/473 |
| 2013/0194308 A1* | 8/2013 | Privault | G06T 11/60 |
| | | | 345/650 |

OTHER PUBLICATIONS

Walsh, David, "CSS Flip Animation", [Online]. Retrieved from the Internet: <URL: http://davidwalsh.name/css-flip>, (Sep. 3, 2014), 88 pgs.

* cited by examiner

610A

First name:
John

Last name:
Doe

E-Mail:
john.doe@acme.com

610B

Input type=text:
| John |

Input type=text;
| Doe |

Input type=text:
| john.doe@acme.com |

← back

620A

A web link

620B

Input type=text:
| A web link |

Input type=text;
| http://www.link.com |

← back

*FIG. 6*

FLIP-TO-EDIT CONTAINER

TECHNICAL FIELD

The subject matter disclosed herein generally relates to the processing of data. Specifically, the present disclosure addresses systems and methods to present and modify graphical user interface (GUI) elements.

BACKGROUND

GUIs display information to users in multiple components such as text boxes, hypertext links, drop-down menus, and the like. Application developers configure these components using programming languages (e.g., C, C++, Java, or JavaScript) and markup languages (e.g., hypertext markup language (HTML) or extensible markup language (XML)). Accordingly, when a developer wishes to modify a GUI, the developer accesses a separate editing tool to modify one or more GUI elements, deploys the changes (e.g., by uploading modified files to a web server or by compiling source code), and then reloads the GUI to verify that the changes were successful.

BRIEF DESCRIPTION OF THE DRAWINGS

Some embodiments are illustrated by way of example and not limitation in the figures of the accompanying drawings.

FIG. 6 is a block diagram illustrating user interfaces suitable for implementing a flip-to-edit container, according to some example embodiments.

DETAILED DESCRIPTION

Figure 1:
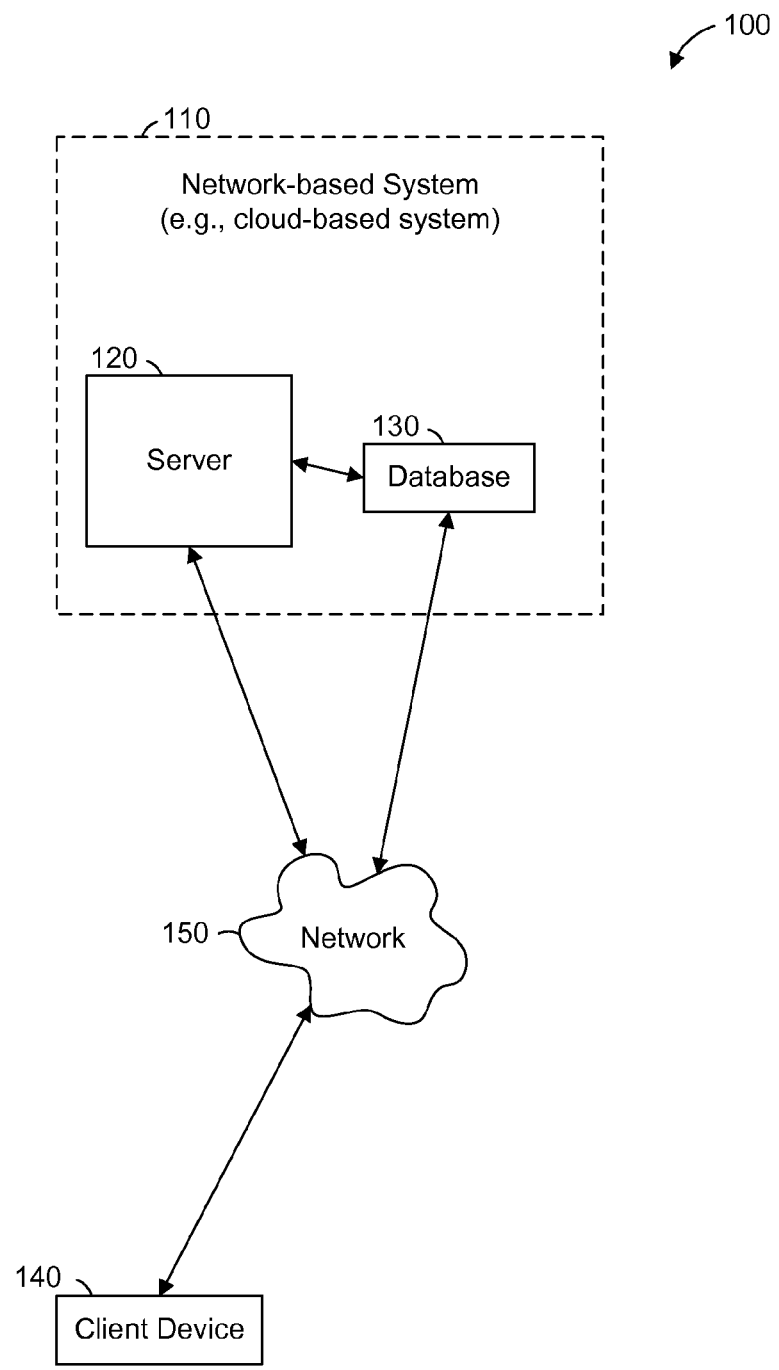
FIG. 1 is a network diagram illustrating a network environment suitable for implementing a flip-to-edit container, according to some example embodiments.

Example methods and systems are directed to providing a flip-to-edit container. The flip-to-edit container may be implemented in a web browser, a software application, an interactive development environment (IDE), an operating system, or any suitable combination thereof. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A flip-to-edit container includes at least two sides. A front side of the container displays viewable content. A back side of the container displays editing controls corresponding to the viewable content. For example, the front side of the container may display a text string and the back side of the container may display a corresponding text entry field that allows modification of the text string.

In some example embodiments, the container is implemented using three document division (DIV) HTML elements in conjunction with a button. The first DIV is a wrapper element that contains the other two DIVs and the button. The second DIV displays the elements of the container without permitting editing of the elements, while the third DIV displays the controls used to modify the elements of the container. The button, when activated, switches the display between the second and third DIVs. The button may be displayed while the editing controls are displayed and hidden while the content is displayed. While the content is displayed, the entire display area may be responsive to a user input to cause display of the editing controls.

Switching between the front-side element display and the back-side editing display may be accompanied by a flipping animation. For example, the display area may rotate along a centrally-aligned vertical axis, causing the front side to disappear when the display area appears edge-on to the user, and the back side to appear as the display area completes the 180 degree rotation.

A resize indicator or edges of the display area may be operable to resize the container. Enlarging the container may cause more information to be displayed, more editing controls to be displayed, or both. Shrinking the container may cause less information to be displayed, fewer editing controls to be displayed, or both. In some example embodiments, the front and back sides of the container may be different sizes. In other example embodiments, resizing either the front or the back side of the container also resizes the other side.

Enabling the flip-to-edit container may be based on permissions of a user account. For example, users may provide a user name and password to a web site. The web site may determine whether a user account matching the provided user name and password has editing permissions for a particular flip-to-edit container, global editing permissions, or both. If the user account has the requisite permissions to edit the content of a flip-to-edit container, then the container will flip in response to the appropriate input. If the user account lacks the requisite permissions, the container will not flip. For example, for an authorized user account, the entire flip-to-edit container may be transmitted to the user's device; for an unauthorized user account, only the display elements (and not the edit elements) may be transmitted.

FIG. 1 is a network diagram illustrating a network environment 100 suitable for implementing a flip-to-edit container, according to some example embodiments. The network environment 100 includes a server machine 120, a database 130, a client device 140, and a network 150. The server machine 120 and the database 130 may collectively comprise a network-based system 110 (e.g., a cloud-based system) capable of providing a flip-to-edit container. The client device 140 may receive the flip-to-edit container from the network-based system 110 and display the container on a display of the client device 140. The server machine 120 may host an application capable of dispatching tasks to the database 130. The server machine 120, the database 130, and the client device 140 may each be implemented in a computer system, in whole or in part, as described below with respect to FIG. 10.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, document-oriented NoSQL databases, a file store, or any suitable combination thereof. The database may be an in-memory database. Moreover, any two or more of the machines, databases, or devices illustrated in FIG. 1 may be combined into a single machine, and the functions described herein for any single machine, database, or device may be subdivided among multiple machines, databases, or devices.

The network-based system 110 and the client device 140 may be connected by the network 150. The network 150 may be any network that enables communication between or among machines, databases, and devices. Accordingly, the network 150 may be a wired network, a wireless network (e.g., a mobile or cellular network), or any suitable combination thereof. The network 150 may include one or more portions that constitute a private network, a public network (e.g., the Internet), or any suitable combination thereof.

Figure 2:
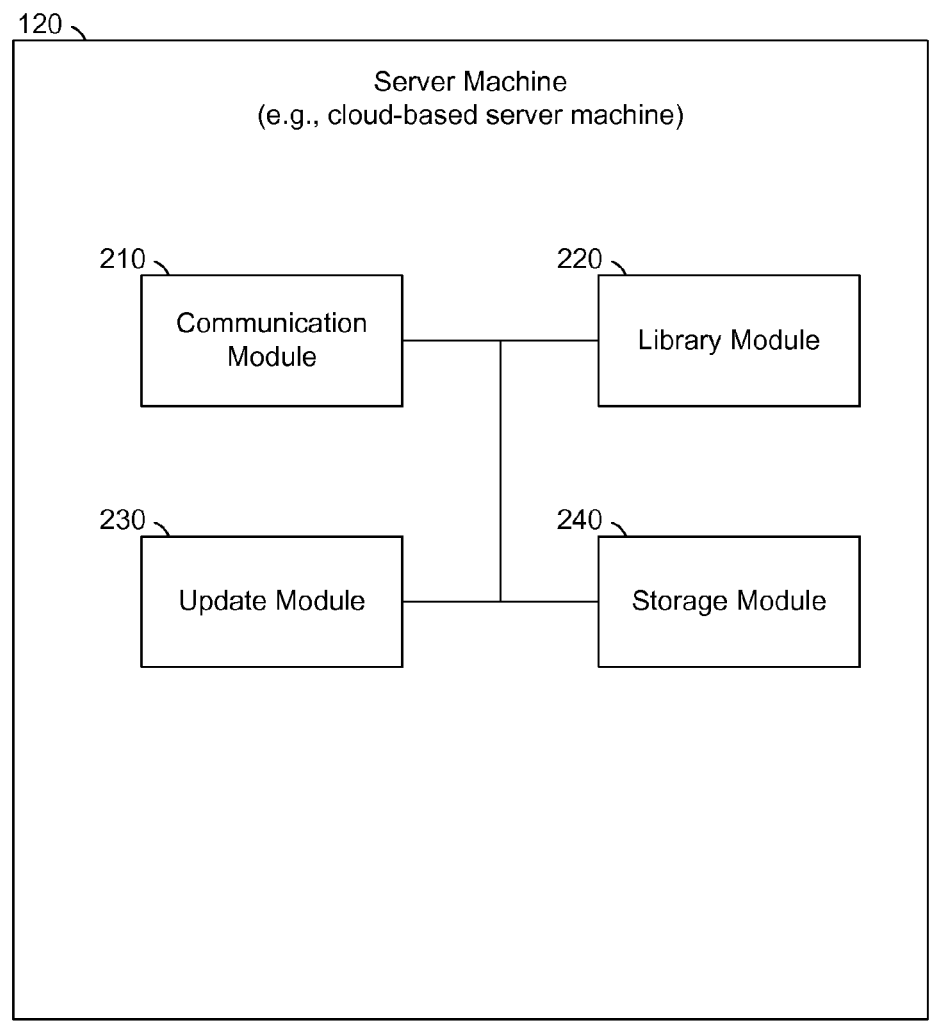
FIG. 2 is a block diagram of a server machine, according to some example embodiments, suitable for implementing a flip-to-edit container.

FIG. 2 is a block diagram illustrating components of the server machine 120, according to some example embodiments. The server machine 120 is shown as including a communication module 210, a library module 220, an update module 230, and a storage module 240, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the server machine 120 and transmits data from the server machine 120. For example, requests for data or code may be received from the client device 140 for use in presenting a flip-to-edit container to a user. Modifications to the flip-to-edit container may also be received from the client device 140.

The library module 220 accesses one or more libraries (e.g., object files, source code files, header files, or any suitable combination thereof) for requested flip-to-edit containers. For example, a separate library may be used for each type of container (e.g., a sticky note container library, a calendar container library, a chat container library, or any suitable combination thereof), for each side of the flip-to-edit containers (e.g., a front-side library, a back-side library, or both), or any suitable combination thereof. The library or libraries responsive to a request from the client device 140 may be transmitted to the client device 140 via the communication module 210, used to generate data to be transmitted to the client device 140, or both. For example, code in a library may be executed by the library module 220 to generate an image and the resulting image transmitted to the client device 140. As another example, JavaScript code in a library may be transmitted to the client device 140 for execution on the client device 140.

The update module 230 updates the content of flip-to-edit containers. For example, after the content of a flip-to-edit container is modified on the client device 140, the communication module 210 may receive the modification from the client device 140. The update module 230 stores the modification (e.g., via the storage module 240). As a result, the next time the same flip-to-edit container is requested, the initial value of the container reflects the modification. For example, user data in an entry for a person in a database accessed using the lightweight directory access protocol (LDAP) may be updated as the user data is viewed and modified. As another example, the flip-to-edit container may represent a file stored on a server. By editing a text field in the container, the name of the file may be changed. In some example embodiments, the update module 230 is not present or is disabled, and changes to flip-to-edit containers are not maintained from one user session to the next.

The storage module 240 stores the data used to implement one or more flip-to-edit containers. For example, source code for the libraries used by the library module 220 may be stored via the storage module 240 in one or more files or databases. Similarly, data for individual flip-to-edit containers may be stored via the storage module 240 in one or more files or databases.

Figure 3:
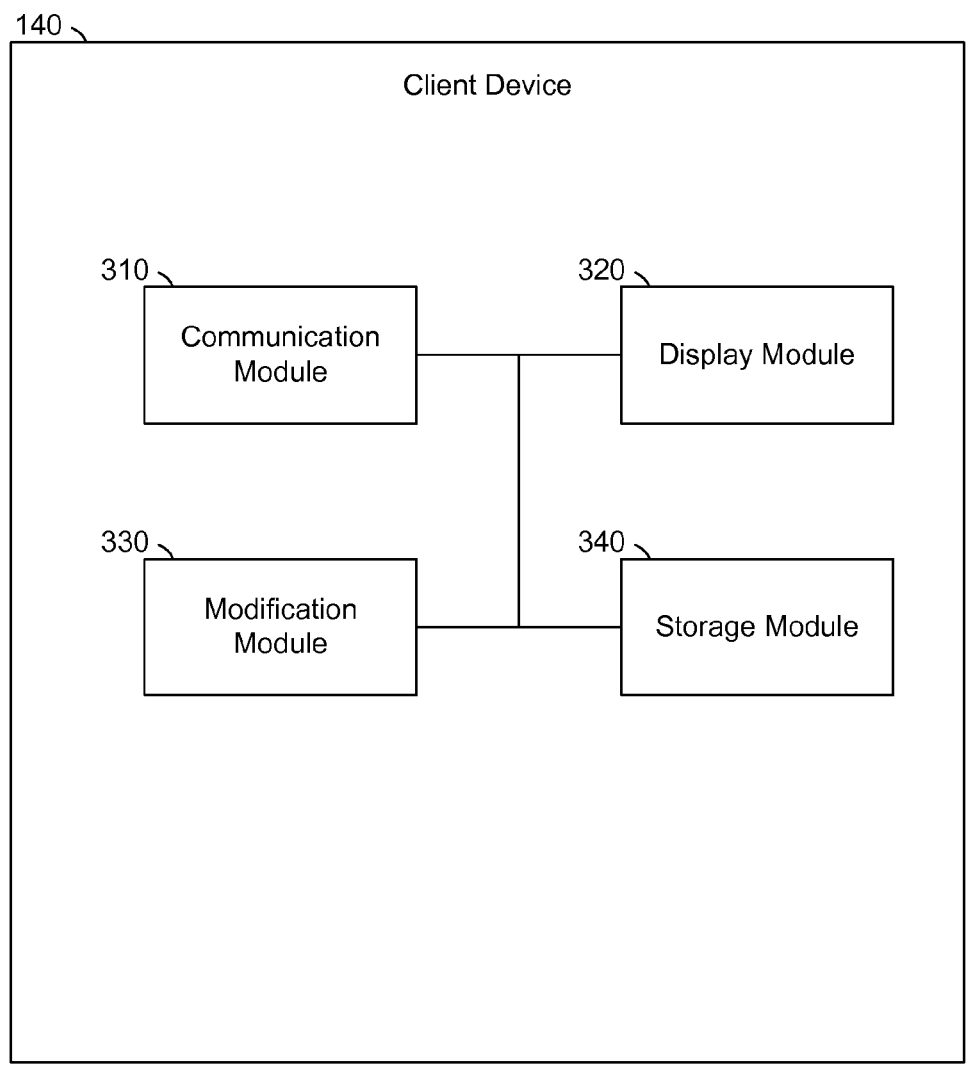
FIG. 3 is a block diagram of a client machine, according to some example embodiments, suitable for interacting with a flip-to-edit container.

FIG. 3 is a block diagram of a client device, according to some example embodiments, suitable for interacting with a flip-to-edit container. The client device 140 is shown as including a communication module 310, a display module 320, a modification module 330, and a storage module 340, all configured to communicate with each other (e.g., via a bus, shared memory, or a switch).

The communication module 310 receives data sent to the client device 140 and transmits data from the client device 140. For example, data may be sent from the client device 140 to request a flip-to-edit container from the server machine 120, to send modifications for a flip-to-edit container to the server machine 120, to receive data or code for displaying a flip-to-edit container from the server machine 120, or any suitable combination thereof. In some example embodiments, data displayed in the flip-to-edit container is periodically updated with new data from the server. For example, an item displaying current stock prices could receive updates every few seconds.

The display module 320 displays the flip-to-edit container on a screen of the client device 140. For example, the display module 320 may be implemented by a processor executing a web browser that interprets code and data received from the server machine 120 via the communication module 310 and generates instructions to a graphics processor which, in turn, causes the flip-to-edit container to be presented on a screen (e.g., a liquid crystal display (LCD) screen, a cathode ray tube (CRT) screen, or multiple display devices that combine to create a logical screen). The display module 320 also handles changing the displayed side of the flip-to-edit container from one side to the other (e.g., in response to a user input).

The modification module 330 modifies a flip-to-edit container displayed on the client device 140. For example, text entered while the editing side of the flip-to-edit container is displayed may be accessed by the modification module 330 and used to change the text displayed on the front side of the container (e.g., at the time the change is made, after the container is flipped back, or any suitable combination thereof). In some example embodiments, the modification occurs by changing values in a domain object model (DOM) of an HTML page being displayed in a web browser. The storage module 340 stores data in a memory of the client device 140, retrieves data from the memory of the client device 140, or both.

According to various example embodiments, one or more of the methodologies described herein may facilitate editing of data displayed in a container. The use of the back side of a container to display editing controls for the container may reduce the use of screen real estate, reduce confusion as to the association between the editing control and the object being edited, or both.

When these effects are considered in aggregate, one or more of the methodologies described herein may obviate a need for certain efforts or resources that otherwise would be involved in editing displayed objects. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 4:
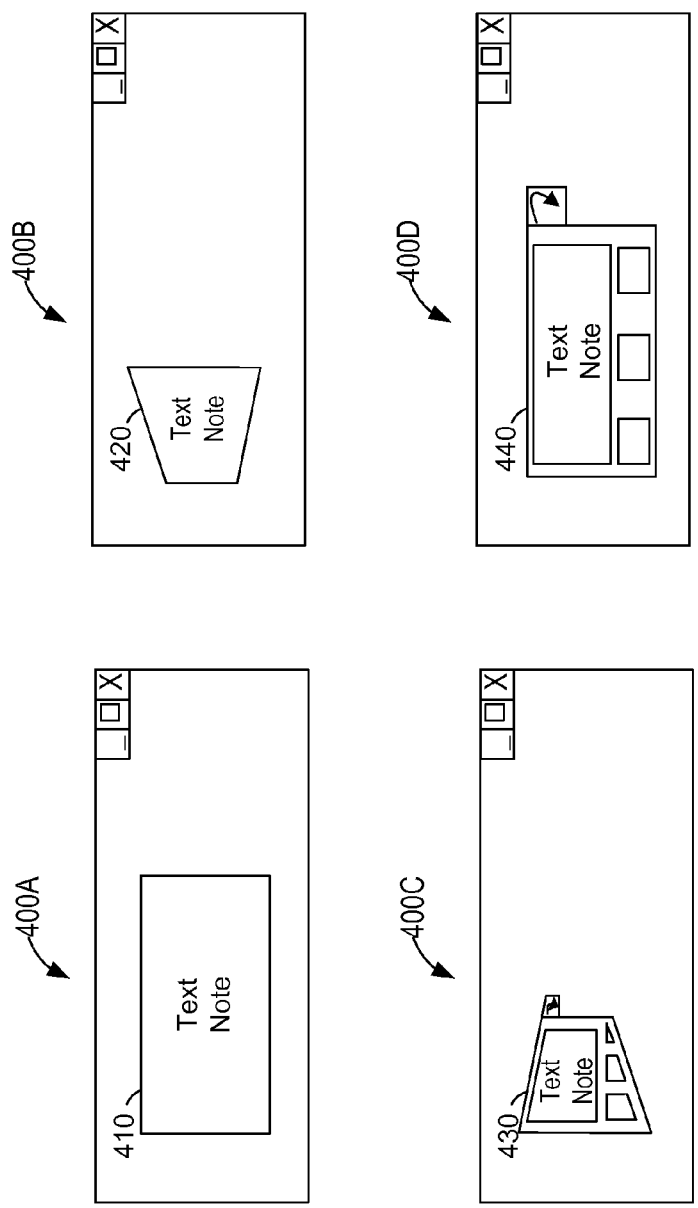
FIG. 4 is a block diagram illustrating a user interface (UI) suitable for implementing a flip-to-edit container, according to some example embodiments.

FIG. 4 is a block diagram illustrating a user interface suitable for implementing a flip-to-edit container, according to some example embodiments. The screens 400A, 400B, 400C, and 400D show a series of images of a flip-to-edit container. The screen 400A shows the front side 410 of the flip-to-edit container. The container includes the text "Text Note." The screen 400B shows an animated version 420 of the front side 410. In the example embodiment of FIG. 4, the flip-to-edit container rotates around a central vertical axis. After the container rotates through an edge-on orientation, in which the container appears as a thin vertical line or disappears entirely (not shown), the screen 400C is shown. The screen 400C shows an animated version 430 of the back side 440. After the animation completes, the screen 400D is shown, with the back side 440 of the flip-to-edit container shown. In the example of FIG. 4, the editing options include a text field operable to change the text displayed, and three buttons of different colors, operable to change the background color of the front side 410. In some example embodiments, the editing options also affect the back side 440. For example, the background color of the front side 410 and the back side 440 may be the same. Also shown with the back side 440 is a button adjacent to the area occupied by the front side 410, operable to cause the flip-to-edit container to flip back to the front side. Other inputs may also be used to cause the flip-to-edit container to flip back to the front side. For example, particular keyboard presses (e.g., enter or escape) may trigger the flipping back of the container. Control of which key presses cause the container to flip back may be provided through the use of UI elements. For example, a checkbox labeled "Flip on Enter" may be provided, which, when checked, causes the enter key to trigger a flip of the container and, when not checked, causes the enter key to be treated as a text input.

In some example embodiments, the container is flipped without an intervening animation (e.g., in response to a determination that the browser in which the container is implemented does not support the flipping animation, in response to a user selection of a faster UI or lower CPU consumption option, or any suitable combination thereof). Accordingly, the front side 410 of screen 400A may be replaced by the back side 440 of screen 400D (and vice versa) without intermediate display of screens 400B and 400C.

Figure 5:
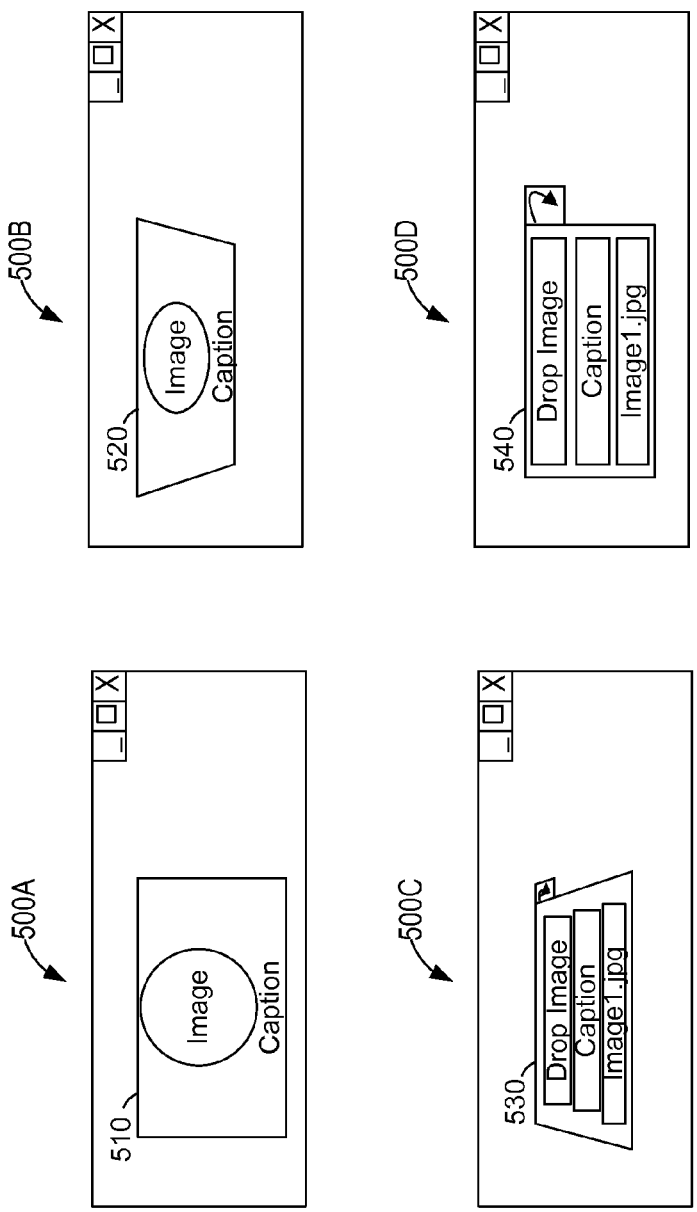
FIG. 5 is a block diagram illustrating a user interface suitable for implementing a flip-to-edit container, according to some example embodiments.

FIG. 5 is a block diagram illustrating a user interface suitable for implementing a flip-to-edit container, according to some example embodiments. The screens 500A, 500B, 500C, and 500D show a series of images of a flip-to-edit container. The screen 500A shows the front side 510 of the flip-to-edit container. The container includes an image, shown as a circle, and a text caption. The screen 500B shows an animated version 520 of the front side 510. In the example embodiment of FIG. 5, the flip-to-edit container rotates around a central horizontal axis. After the container rotates through an edge-on orientation, in which the container appears as a thin horizontal line or disappears entirely (not shown), the screen 500C is shown. The screen 500C shows an animated version 530 of the back side 540. After the animation completes, the screen 500D is shown, with the back side 540 of the flip-to-edit container shown. In the example of FIG. 5, the editing options include an area operable to receive an image file via drag-and-drop or file selection using a system dialog, a text field operable to change the caption displayed, and a file picker field operable to receive a file name or display a further user interface to select a file from the local storage of the client device 140. Also shown with the back side 540 is a button adjacent to the area occupied by the front side 510, operable to cause the flip-to-edit container to flip back to the front side. In some example embodiments, the container is flipped without an intervening animation. Accordingly, the front side 510 of screen 500A may be replaced by the back side 540 of screen 500D (and vice versa) without intermediate display of screens 500B and 500C.

FIG. 6 is a block diagram illustrating user interfaces suitable for implementing a flip-to-edit container, according to some example embodiments. User interface elements 610A and 610B are a first front- and back-side pair. User interface elements 620A and 620B are a second front- and back-side pair.

The UI element 610A shows information for a user including a first name, a last name, and an email address. The UI element 610B shows three text input fields operable to change the first name, last name, and email address, respectively. The UI element 610B also shows a button labeled "back," operable to restore display of the UI element 610A. Transitions between the UI elements 610A and 610B may be performed in the manner described with respect to FIGS. 4 and 5, above.

The UI element 620A shows a hypertext link, operable to cause display of a document corresponding to an address of the link (e.g., to cause retrieval and display of a web page from a uniform resource locator (URL) identified by the link). The UI element 620B shows two text input fields operable to change the text displayed to indicate the link and the address of the link, respectively. The UI element 620B also shows a button labeled "back," operable to restore display of the UI element 620A. Transitions between the UI elements 620A and 620B may be performed in the manner described with respect to FIGS. 4 and 5, above.

Figure 7:
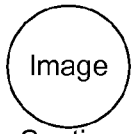
FIG. 7 is a block diagram illustrating user interfaces suitable for implementing a flip-to-edit container, according to some example embodiments.

FIG. 7 is a block diagram illustrating user interfaces suitable for implementing a flip-to-edit container, according to some example embodiments. Each of the front-side elements 710A, 720A, and 730A are generated from the same content data with different display dimensions. Each of the back-side elements 710B, 720B, and 730B show editing options for the data at each of the different display dimensions. Accordingly, in front-side element 710A, a headline and text are shown. In back-side element 710B, a text entry field operable to modify the headline and a textarea entry field operable to modify the text are shown, along with a button operable to cause the editing element to be hidden and the front-side element 710A to be shown.

Relative to the front-side element 710A, the front-side element 720A has been resized to have a larger horizontal dimension. For example, a click and drag of the right edge of the front-side element 710A may have been detected. In response, the display module 330 may have caused presentation of the front-side element 720A. As a result of the resizing, the front-side element 720A shows an image and a corresponding caption in addition to the headline and the text. Similarly, the back-side element 720B shows an image upload tool in addition to the text input field, the textarea input field, and the flip button.

Additional options, not shown, include text editing tools such as bold, italic, underline, font size, type face, paragraph alignment, numbering, bullet points, and so on. As discussed with respect to the back-side element 720B, these additional editing tools can be shown or hidden based on the size of the back-side element.

The front-side element 730A corresponds to the front-side element 710A after a resizing operation that increased the vertical dimension. For example, a click and drag of the bottom edge of the front-side element 710A may have been detected. In response, the display module 330 may have caused presentation of the front-side element 730A. Like the front-side element 720A, the front-side element 730A shows a headline, an image, a corresponding caption, and text. Similarly, the back-side element 730B shows the upload image tool, the text input field, the textarea input field, and the flip button.

Figure 8:
FIG. 8 is a block diagram illustrating a user interface suitable for implementing a flip-to-edit container, according to some example embodiments.

FIG. 8 is a block diagram illustrating user interfaces suitable for implementing a flip-to-edit container, according to some example embodiments. In some example embodiments, the front-side element 810A is generated from the same data as the front-side elements 710A, 720A, and 730A with different display dimensions. For example, a click and drag of the lower-right corner of the front-side element 710A may have been detected. In response, the display module 330 may have caused presentation of the front-side element 810A. The back-side element 810B shows editing options for the data with the same dimensions as the front-side element 810A. In the front-side element 810A, a headline, text, an image, a caption, and two comments are shown. In the back-side element 810B, a text entry field operable to modify the headline, a textarea entry field operable to modify the text, an upload option to replace the image, and options to edit or delete the comments are shown, along with a button operable to cause the editing elements to be hidden and the front-side element 810A to be shown.

In some example embodiments, data to be displayed in the front-side element 810A is downloaded from a server in response to an increase in size. For example, the front-side element 710A does not show the image or the caption. Accordingly, the front-side element 710A could be displayed without downloading the image from the server. In response to the resizing of the front-side element 710A into the front-side element 810A, the client can determine that the image is needed and send a request to the server. After the image is received from the server, the front-side element 810A is updated to display the image. Similarly, the size of the image may depend on the size of the front-size element.

Thus, a small image can be downloaded when only a small image is being displayed, and a larger image can be downloaded in response to an increase in size of the display area for the image.

The example editing tools of FIGS. 7-8 are illustrative and not limiting. Additional editing tools include a headline tool providing caption, style, and size options; a sprite tool for a sprite that uses a font size proportional to the size of the sprite providing color and style (e.g., circle or leaf) options; a video tool for a video that shows a still on the front side and is operable to pop-up a video window providing file options; a document tool for a document that shows a thumbnail or extract on the front side and is operable to open the file providing title and file options; and a person or contact tool for a contact that shows a picture, name, email address, and phone number of a person providing options to edit each of those fields.

Two additional types of objects are groups and lines. The front side of a group object defines an area (e.g., using an outline, a solid or translucent fill color, or both). Other objects placed in the defined area become part of the group. When the group object is moved, the objects in the group are moved with it. The back side of the group object may include editing tools to alter the name of the group, the color of the group, the opacity of the group, or any suitable combination thereof.

The front side of a line is a solid, dashed, or dotted line. The back side of a line object allows selection of the line style, line color, line orientation, or any suitable combination thereof. Since a line has very low thickness in one direction, the back side of the line will likely be larger than the front side, to provide room for the editing tools. In the example embodiments shown in FIGS. 7 and 8, the back-side elements have the same size as the corresponding front-side elements. However, as the example of a line object makes clear, the back-side element can be larger or smaller than the corresponding front-side element.

Figure 9:
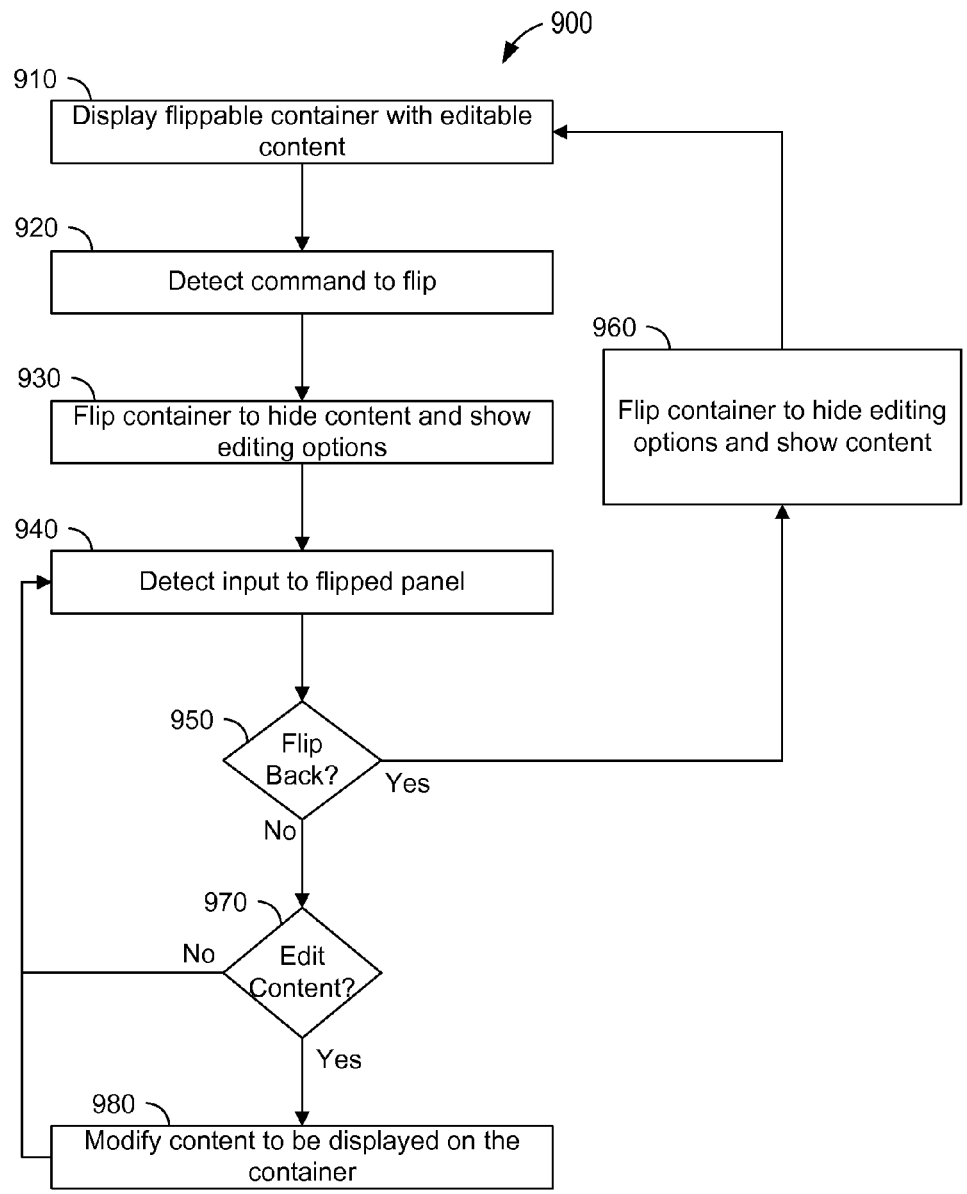
FIG. 9 is a flowchart illustrating operations, according to some example embodiments, suitable for implementing a flip-to-edit container.

FIG. 9 is a flowchart illustrating operations of a method 900, according to some example embodiments, suitable for implementing a flip-to-edit container. By way of example and not limitation, the method 900 is described as being performed by the client device 140 using the modules shown in FIG. 3.

In operation 910, the display module 320 displays a flippable container with editable content. For example, the server machine 120 may have sent a web page including JavaScript for a flippable container. In response, a web browser may interpret the JavaScript and display the flippable container. For example, the screen 400A of FIG. 4 may be presented.

A command to flip is detected by the display module 320 (operation 920). For example, the user may click on the flippable container using a mouse, tap the flippable container using a touch screen, enter a keyboard command to flip all currently-displayed flippable containers (e.g., to simultaneously flip two or more flippable containers), interact with a designated portion of the flippable container to cause it to flip (e.g., a button), or any suitable combination thereof. In some example embodiments, interacting with a portion of the flippable container that does not contain edit controls causes the container to flip back to the front side.

The display module 320 flips the container to hide the editable content and show editing options in operation 930. For example, an animation described above with respect to FIG. 4 or 5 may be performed. The flipping may be performed in response to detecting the command to flip in operation 920. In some example embodiments, the available editing options are generated dynamically, based on the editable content displayed in operation 910. For example, the portion of the DOM containing the flippable container may be traversed to identify elements for which editing controls are available (e.g., text fields, images, and so on). Based on the recognized elements, corresponding editing controls can be added to the portion of the DOM containing the back side of the flippable container. Thus, when the flipped side is displayed, the dynamically-created editing tools will be displayed.

In operation 940, input to the flipped panel is detected by the display module 320. For example, operation of a button to restore display of the content may be detected. As another example, operation of an editing field displayed on the flipped panel may be detected. If the input indicates a request to flip back (operation 950), the flippable container flips back and displays the content of the flippable container (operation 960). For example, the animation used in operation 930 may be reversed. As another example, the same animation may be used. Thus, in some example embodiments, a full 360 degree rotation is achieved by flipping and flipping again. In other example embodiments, a 180 degree rotation occurs in one direction when flipping from content to editor, and in the opposite direction when flipping from editor to content.

If editing commands are detected (operation 970), the displayable content of the container is modified (operation 980) by the modification module 330. For example, if text is displayed on the front side of the flip-to-edit container and a corresponding text field is modified in operation 970 on the back side of the flip-to-edit container, then when the container is flipped from the back side to the front side in operation 960, the changed text is displayed. In some example embodiments, changed values are transmitted from the client device 140 to the server machine 120 (e.g., as part of the operation 980, as part of the operation 960, in response to an explicit command, or any suitable combination thereof).

Figure 10:
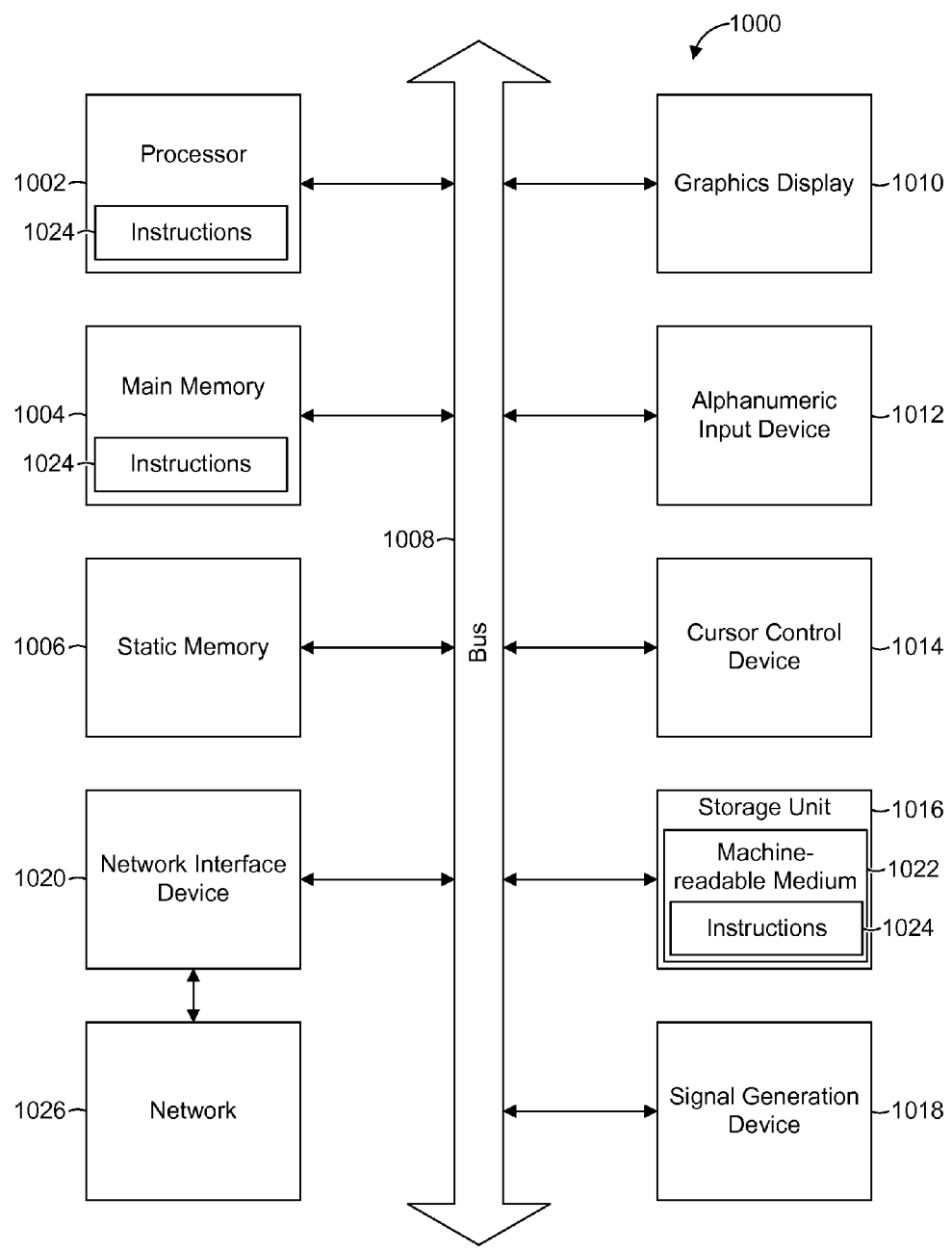
FIG. 10 is a block diagram illustrating components of a machine, according to some example embodiments.

FIG. 10 is a block diagram illustrating components of a machine 1000, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 10 shows a diagrammatic representation of the machine 1000 in the example form of a computer system and within which instructions 1024 (e.g., software, a program, an application, an applet, an app, or other executable code) for causing the machine 1000 to perform any one or more of the methodologies discussed herein may be executed, in whole or in part. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include a collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1000), such that the instructions, when executed by one or more processors of the machine (e.g., processor 1002), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
accessing hypertext markup language (HTML) data that includes a first document division (DIV) element that comprises a second DIV element, a third DIV element, and a button element;
causing presentation on a display device of a first user interface element based on the second DIV element, the first user interface element occupying a display area;
causing presentation on the display device of a button based on the button element, the button being presented within the display area;
detecting an interaction with the button; and
responsive to the detected interaction, causing, by a processor of a machine, the presentation of a flipping animation in which the first user interface element is hidden and a second user interface element based on the third DIV element is shown, the second user interface element including one or more options to modify the first user interface element and an option to restore the presentation of the first user interface element, the option to restore the presentation of the first user interface element being outside of the display area.

2. The method of claim 1, further comprising:
detecting selection of the option to restore the presentation of the first user interface element; and
responsive to the detected selection, causing the presentation of a flipping animation in which the second user interface element is hidden and the first user interface element is shown.

3. The method of claim 1, further comprising:
detecting selection of an option of the one or more options to modify the first user interface element; and
responsive to the selected detection, modifying a data structure corresponding to the first user interface element, the modification sufficient to alter the first user interface element in accordance with the selected option.

4. The method of claim 1, wherein the one or more options to modify the first user interface element that are presented in the second user interface element are a subset of a set of possible options; and
the method further comprises:
selecting the subset of options from the set of possible options based on a size of the first user interface element.

5. The method of claim 4, further comprising:
increasing a size of the second user interface element; and
based on the increase in size, adding options from the set of possible options to the subset of options to modify the first user interface element that are presented in the second user interface element.

6. The method of claim 1, wherein:
the first user interface element includes text; and
the one or more options to modify the first user interface element include an option to modify the text.

7. The method of claim 1, wherein:
the first user interface element includes an image; and
the one or more options to modify the first user interface element include an option to replace the image with a different image.

8. The method of claim 1, wherein:
the first user interface element includes a background color; and
the one or more options to modify the first user interface element include an option to modify the background color.

9. The method of claim 1, wherein:
subsequent to the presentation of the flipping animation, the second user interface element occupies the display area.

10. The method of claim 1, wherein:
the one or more options to modify the first user interface element are determined, by the processor of the machine, based on the first user interface element.

11. A system comprising:
a memory that stores instructions; and
one or more hardware processors configured by the instructions to perform operations comprising:
accessing hypertext markup language (HTML) data that includes a first document division (DIV) element that comprises a second DIV element, a third DIV element, and a button element;
causing presentation on a display device of a first user interface element based on the second DIV element, the first user interface element occupying a display area;
causing presentation on the display device of a button based on the button element, the button being presented within the display area;
detecting an interaction with the button; and
in response to the detected interaction, causing the presentation of a flipping animation in which the first user interface element is hidden and a second user interface element based on the third DIV element is shown, the second user interface element including one or more options to modify the first user interface element and an option to restore the presentation of the first user interface element, the option to restore the presentation of the first user interface element being outside of the display area.

12. The system of claim 11, wherein the operations further comprise:
detecting selection of the option to restore the presentation of the first user interface element; and
responsive to the detected selection, causing the presentation of a flipping animation in which the second user interface element is hidden and the first user interface element is shown.

13. The system of claim 11, further operations further comprise:
detecting selection of an option of the one or more options to modify the first user interface element; and
responsive to the selected detection, modifying a data structure corresponding to the first user interface element, the modification sufficient to alter the first user interface element in accordance with the selected option.

14. The system of claim 11, wherein the one or more options to modify the first user interface element that are presented in the second user interface element are a subset of a set of possible options; and the operations further comprise:
selecting the subset of options from the set of possible options based on a size of the first user interface element.

15. The system of claim 14, wherein the operations further comprise:
increasing a size of the second user interface element; and
based on the increase in size, adding options from the set of possible options to the subset of options to modify the first user interface element that are presented in the second user interface element.

16. The system of claim 14, wherein:
the first user interface element includes text; and
the one or more options to modify the first user interface element include an option to modify the text.

17. A non-transitory machine-readable storage medium comprising instructions that, when executed by one or more processors of a machine, cause the machine to perform operations comprising:
accessing hypertext markup language (HTML) data that includes a first document division (DIV) element that comprises a second DIV element, a third DIV element, and a button element;
causing presentation on a display device of a first user interface element based on the second DIV element, the first user interface element occupying a display area;
causing presentation on the display device of a button based on the button element, the button being presented within the display area;
detecting an interaction with the button; and
responsive to the detected interaction, causing the presentation of a flipping animation in which the first user interface element is hidden and a second user interface element based on the third DIV element is shown, the second user interface element including one or more options to modify the first user interface element and an option to restore the presentation of the first user interface element, the option to restore the presentation of the first user interface element being outside of the display area.

* * * * *